Dec. 6, 1960 A. A. PETRILLO 2,962,741

PORTABLE ELECTRICALLY OPERATED DISH WASHER

Filed April 15, 1957 10 Sheets-Sheet 1

INVENTOR.

ALBERT A. PETRILLO

BY

Carl Miller

ATTORNEY

Dec. 6, 1960 A. A. PETRILLO 2,962,741

PORTABLE ELECTRICALLY OPERATED DISH WASHER

Filed April 15, 1957 10 Sheets-Sheet 2

INVENTOR.
ALBERT A. PETRILLO
BY
Carl Miller
ATTORNEY

Dec. 6, 1960 A. A. PETRILLO 2,962,741
PORTABLE ELECTRICALLY OPERATED DISH WASHER
Filed April 15, 1957 10 Sheets-Sheet 3

INVENTOR.
ALBERT A. PETRILLO
BY
Carl Miller
ATTORNEY

Dec. 6, 1960 A. A. PETRILLO 2,962,741

PORTABLE ELECTRICALLY OPERATED DISH WASHER

Filed April 15, 1957 10 Sheets-Sheet 4

INVENTOR.
ALBERT A. PETRILLO
BY
Carl Miller
ATTORNEY

Dec. 6, 1960 A. A. PETRILLO 2,962,741

PORTABLE ELECTRICALLY OPERATED DISH WASHER

Filed April 15, 1957 10 Sheets-Sheet 5

INVENTOR.
ALBERT A. PETRILLO
BY
Carl Miller
ATTORNEY

PORTABLE ELECTRICALLY OPERATED DISH WASHER

Filed April 15, 1957

10 Sheets-Sheet 6

INVENTOR.

ALBERT A. PETRILLO

BY

Carl Miller

ATTORNEY

Dec. 6, 1960 A. A. PETRILLO 2,962,741

PORTABLE ELECTRICALLY OPERATED DISH WASHER

Filed April 15, 1957 10 Sheets-Sheet 7

INVENTOR.

ALBERT A. PETRILLO

BY

Carl Miller

ATTORNEY

INVENTOR.
ALBERT A. PETRILLO
BY
Carl Miller
ATTORNEY

INVENTOR.
ALBERT A. PETRILLO
BY
Carl Miller
ATTORNEY

Dec. 6, 1960 A. A. PETRILLO 2,962,741

PORTABLE ELECTRICALLY OPERATED DISH WASHER

Filed April 15, 1957 10 Sheets-Sheet 10

INVENTOR.
ALBERT A. PETRILLO
BY
Carl Miller
ATTORNEY

United States Patent Office 2,962,741
Patented Dec. 6, 1960

2,962,741

PORTABLE ELECTRICALLY OPERATED DISH WASHER

Albert A. Petrillo, 115 Urban St., Mount Vernon, N.Y.

Filed Apr. 15, 1957, Ser. No. 652,906
3 Claims. (Cl. 15—74)

This invention relates to dish washing apparatus, and more particularly, to a portable dish washer for washing dishes and plates.

While various types of dish washers have been designed for home use, many have been found to be objectionable in that they require a permanent installation or are too difficult to move from one place to another. This is particularly true when it is desired to use a single dish washing machine in various locations throughout the house or when it is found desirable to transport the unit to a different location. Of course, certain types of portable dish washers have been provided for various purposes. These portable dish washers, however, either require an inconvenient amount of floor space or storage area. Therefore, an object of the present invention is to provide a portable dish washing machine that is simple in construction, efficient in operation, and which will overcome the aforementioned inconveniences.

Another object of the present invention is to provide a compact electrically operated machine for washing various types of plates and dishes and which may be conveniently carried from one place to another.

A further object of the present invention is to provide a portable electrically operated dish washer having electrically powered drive means for simultaneously conveying dishes from one end to the other and for rotating a plurality of bristle brushes that are used to clean and dry the plates.

A still further object of the present invention is to provide an attractive portable dish washer having an inlet at one end for receiving dirty dishes and an outlet at the opposite end for discharging processed dishes, the conveying and cleaning means being completely contained within the housing and presenting a neat and attractive appearance.

Still a further object of the present invention is to provide a portable dish washer that may be readily installed at any desired location with a minimum amount of effort and without requiring any permanent changes in the dish washing apparatus or the plumbing or the electrical fixtures.

A more specific object of the present invention is to provide a portable dish washer having a removable detergent tray for supplying liquid detergent to the bristle brushes during the operation of the machine, and a liquid supply conduit disposed adjacent to the discharge end of the dish washer for thoroughly rinsing and drying the dishes as they emerge from the outlet end of the device.

All of the foregoing and still further objects and advantages of this invention will become apparent from a study of the following specification, taken in connection with the accompanying drawing, wherein.

Figures 1, 2:
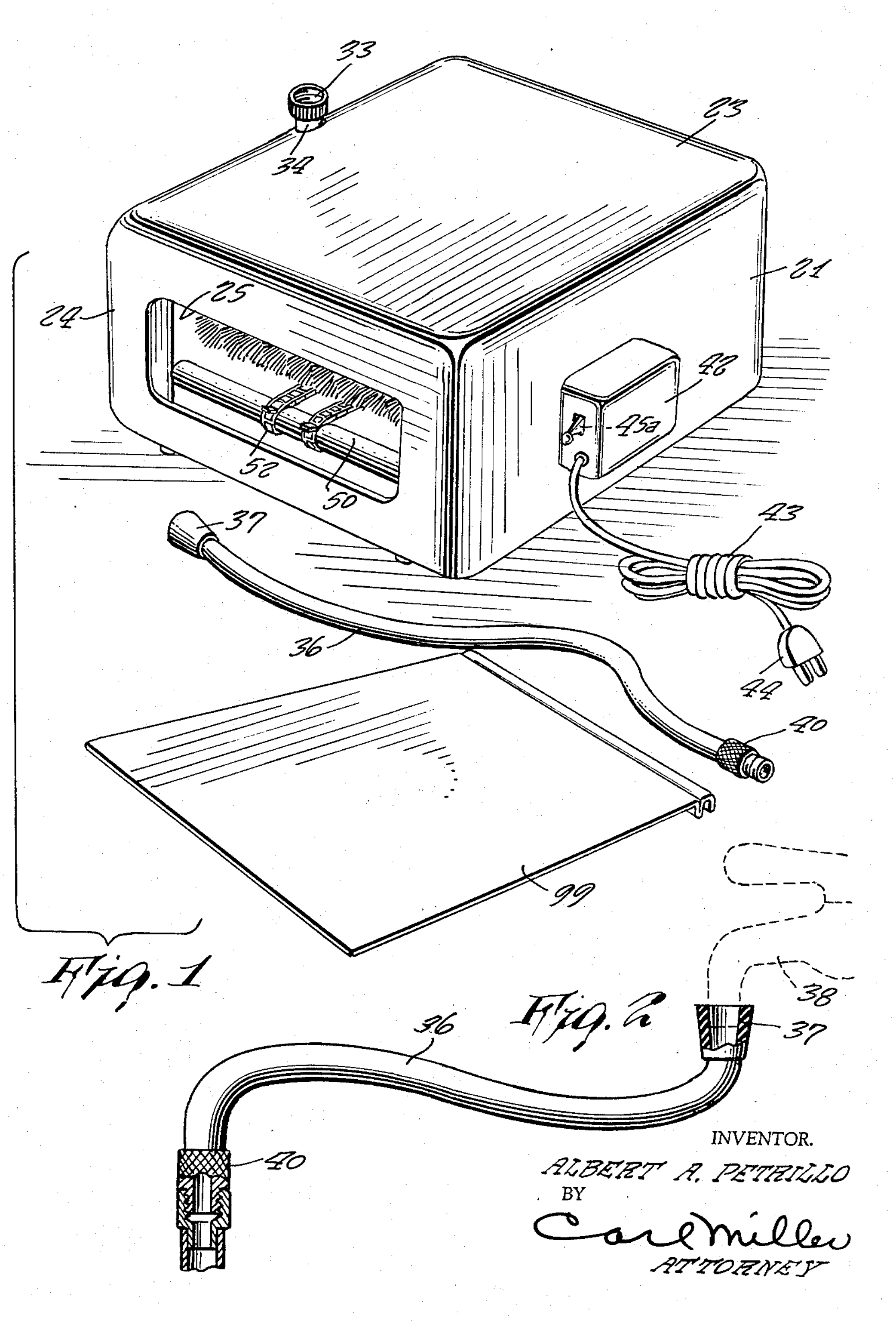
Figure 1 is a perspective view of a portable dish washer made in accordance with the present invention.
Figure 2 is a side view showing the water supply means forming a part of the present invention.
Figure 3:
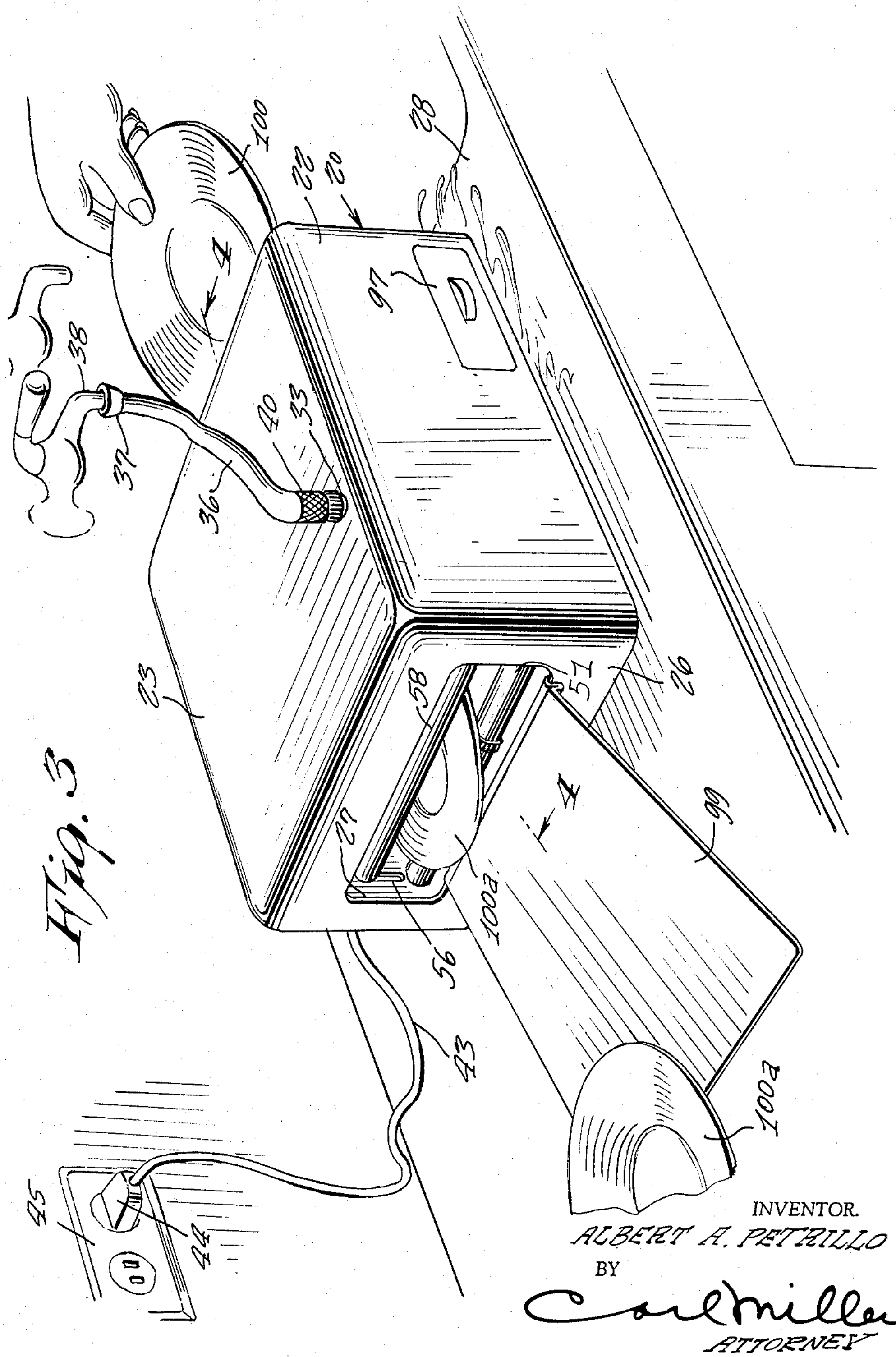
Figure 3 is a perspective view similar to Figure 1, showing the device in operation.
Figure 4:
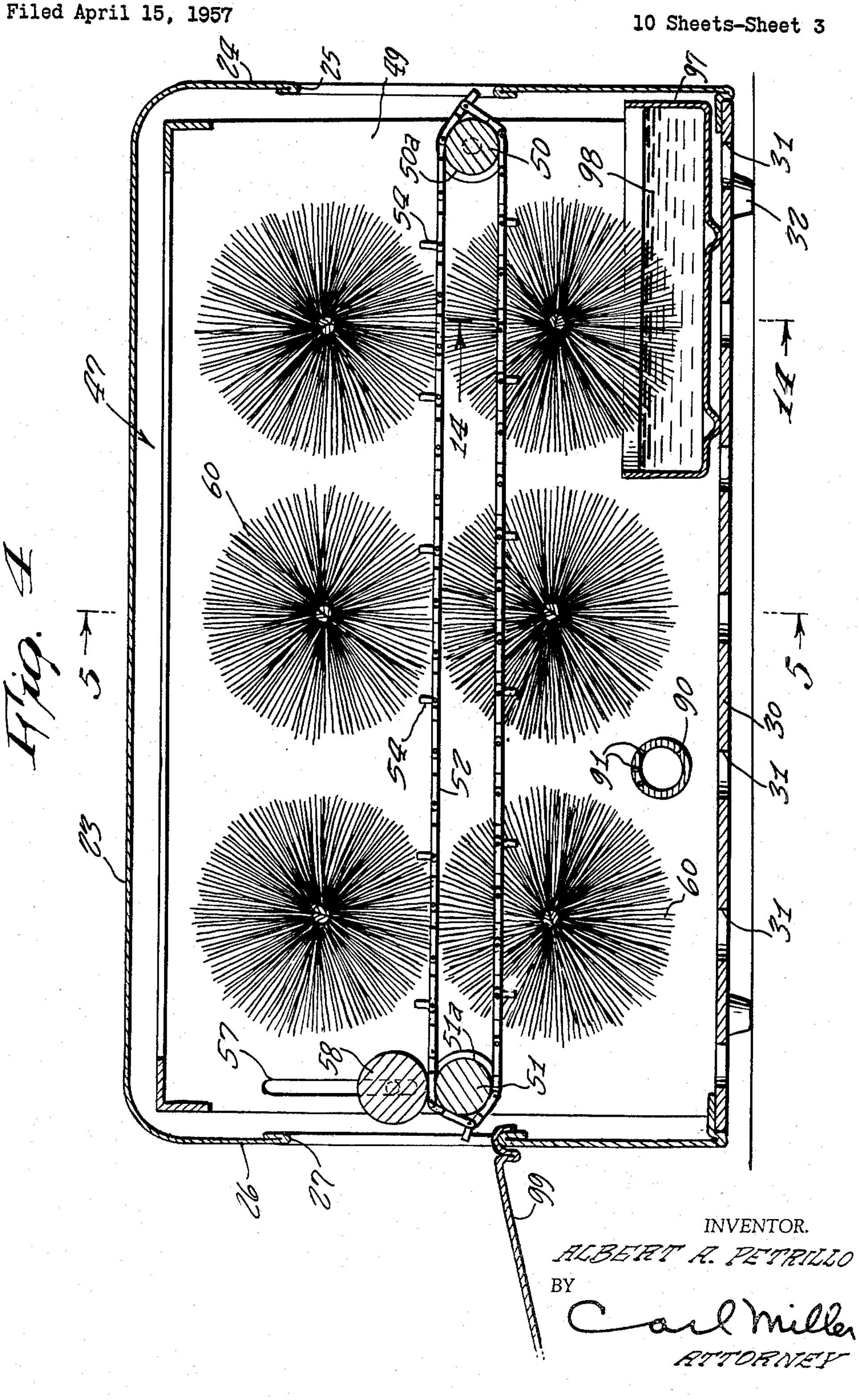
Figure 4 is a cross sectional view taken along line 4—4 of Figure 3.

Referring now to the drawing, and more particularly to Figures 1 to 3 thereof, a portable dish washing machine made in accordance with the present invention is shown to include an attractive outer housing 20 that has spaced side walls 21, 22, a top 23, and longitudinally spaced end walls 24, 26. One of the end walls 24 is provided with a centrally located aperture 25 that defines an inlet for dishes to be washed, while the opposite end wall 26 defines a similar aperture 27 for providing an outlet through which the cleaned dishes are discharged. As is more clearly shown in Figure 4, the housing 20 also includes a bottom wall 30 that is provided with a plurality of perforations 31 for providing means for discharging water used therewithin for the cleaning of the dishes. The bottom member is also provided with a plurality of feet 32 so that the device may be conveniently supported on any desired surface, such as the drainboard 28 of a sink.

An inlet coupling 33 extends upwardly from the top 23 of the housing and is associated with a water supply line 34 that extends downwardly into the interior of the housing, as will be hereinafter described. A relatively short flexible conduit 36 having a flexible coupling 37 at one end for releasable engagement with the spout 38 of the sink, is provided with a threaded coupling 40 at the opposite end for releasable engagement with the inlet 33 of the water supply line. Thus, water of any desired temperature may be supplied to the interior of the housing 20 for purposes hereinafter described.

Figure 7:
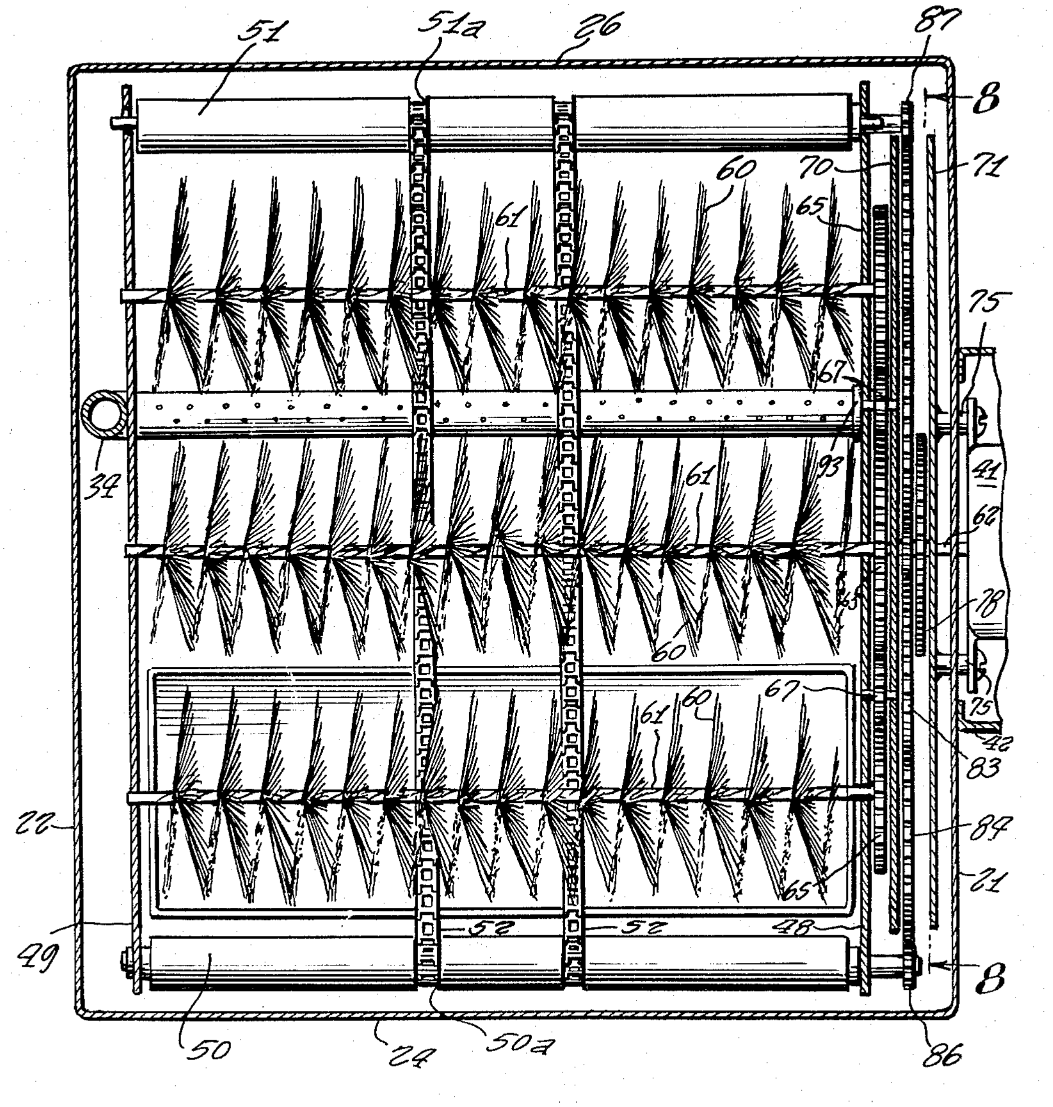
Figure 7 is a cross sectional view taken along line 7—7 of Figure 5.
Figure 8:
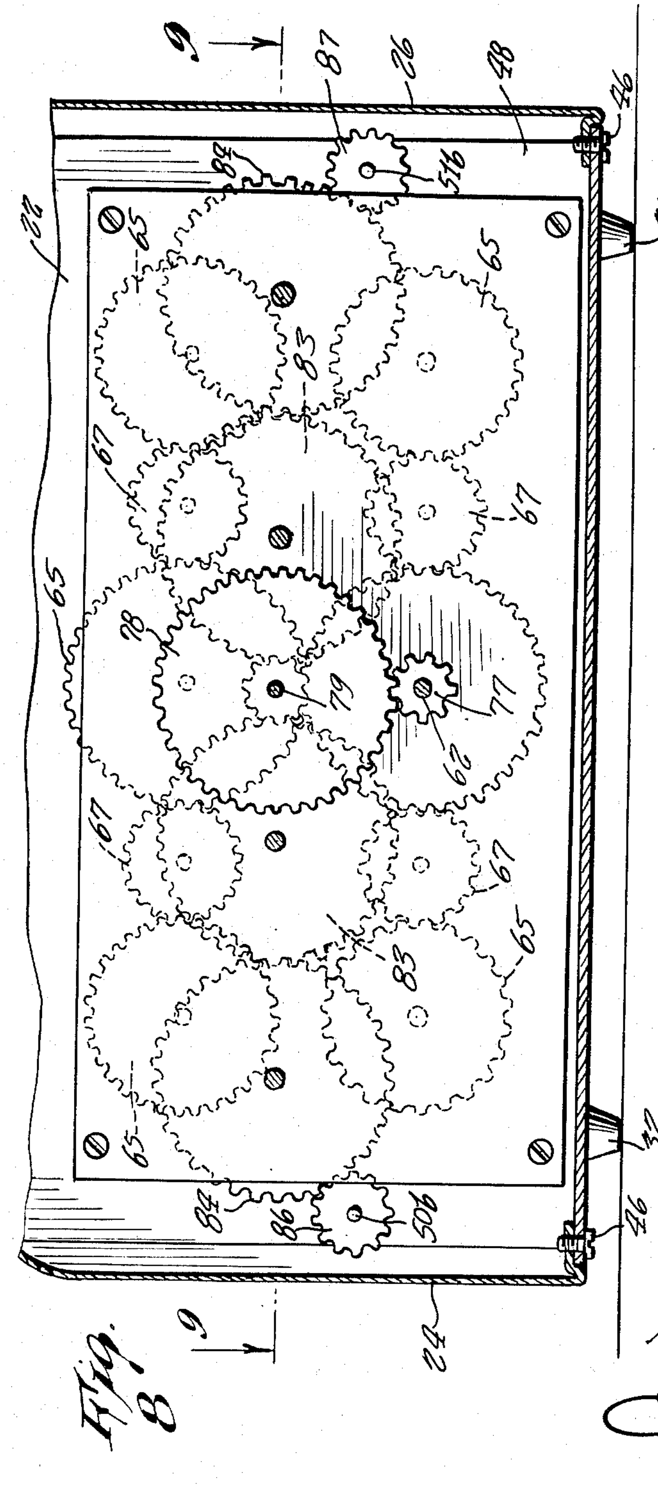
Figure 8 is a longitudinal cross sectional view taken along line 8—8 of Figure 7.
Figure 9:
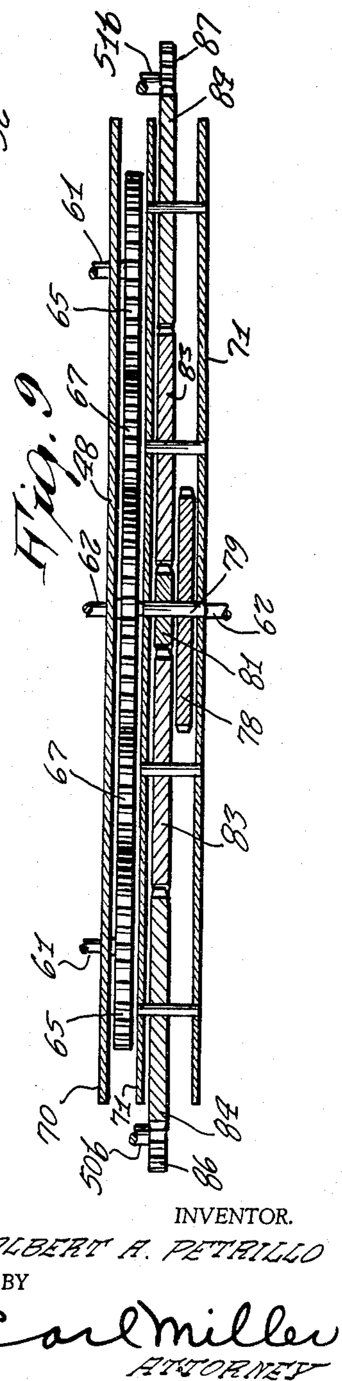
Figure 9 is a cross sectional view taken along line 9—9 of Figure 8.

One side 21 of the housing is provided with a motor housing 42 which encloses an electrically operated motor 41, as is more clearly shown in Figures 1 and 7. The motor 41 is supplied through an electrical supply line 43 having a male plug 44 at one end for selective engagement with a receptacle 45. An on-off switch 45a is also carried by the housing 42 for controlling the operation of the machine.

Referring now to Figures 7 to 12, the interior of the housing 20 is shown to include an auxiliary frame 47 which supports the operating parts of the machine and which is secured to the bottom 30 of the housing in any suitable manner, such as by bolts 46. This frame 47 includes a pair of spaced side walls 48, 49, which rotatably support a pair of longitudinally spaced drive shafts 50, 51, that have laterally spaced circumferential grooves **50*a*, 51*a*. Each shaft is also provided with an extension 50*b*, 51*b*, at each end, these extensions being rotatably received within aligned openings 50*c*, 51*c*, in each of the side walls 48, 49, respectively. A pair of similar link belts 52 are trained about the grooved portions of each of the shafts 50, 51, for transporting dishes from one end of the machine to the other. Each belt 52 is constructed from a plurality of similar links, certain ones 33 of which are provided with upwardly turned lugs 54 that are adapted to grip the dish and move it along its path. The discharge ends of the side walls 48, 49, are provided with vertically disposed slots 56, 57, respectively, within which the outwardly extending portions 58*a* of a pressure roller 58 are rotatably supported and arranged for movement in a vertical direction. This pressure roller 58** exerts a downward pressure upon the dishes as they pass through the machine so that they are maintained in engagement with the belts until they are completely discharged from the housing.

Three longitudinally spaced sets of bristle brushes 60 are supported for rotation within the housing. Each set of brushes includes one that is disposed above the upper pass of the belt, the other of which is disposed below that level. Each brush 60 is provided with a transversely extending shaft 61 that is rotatably supported within aligned openings **63*a*, 63*b*, in the frame side walls 48, 49, respectively. The motor shaft 62 is integrally connected to the center one of the shafts 61 so as to effect rotation thereof. Each of the shafts 61 is also provided with a spur gear 65 that meshes with an idler gear 67** so as to transmit motion from the central motor and brush shaft to each of the other brushes .

Figure 10:
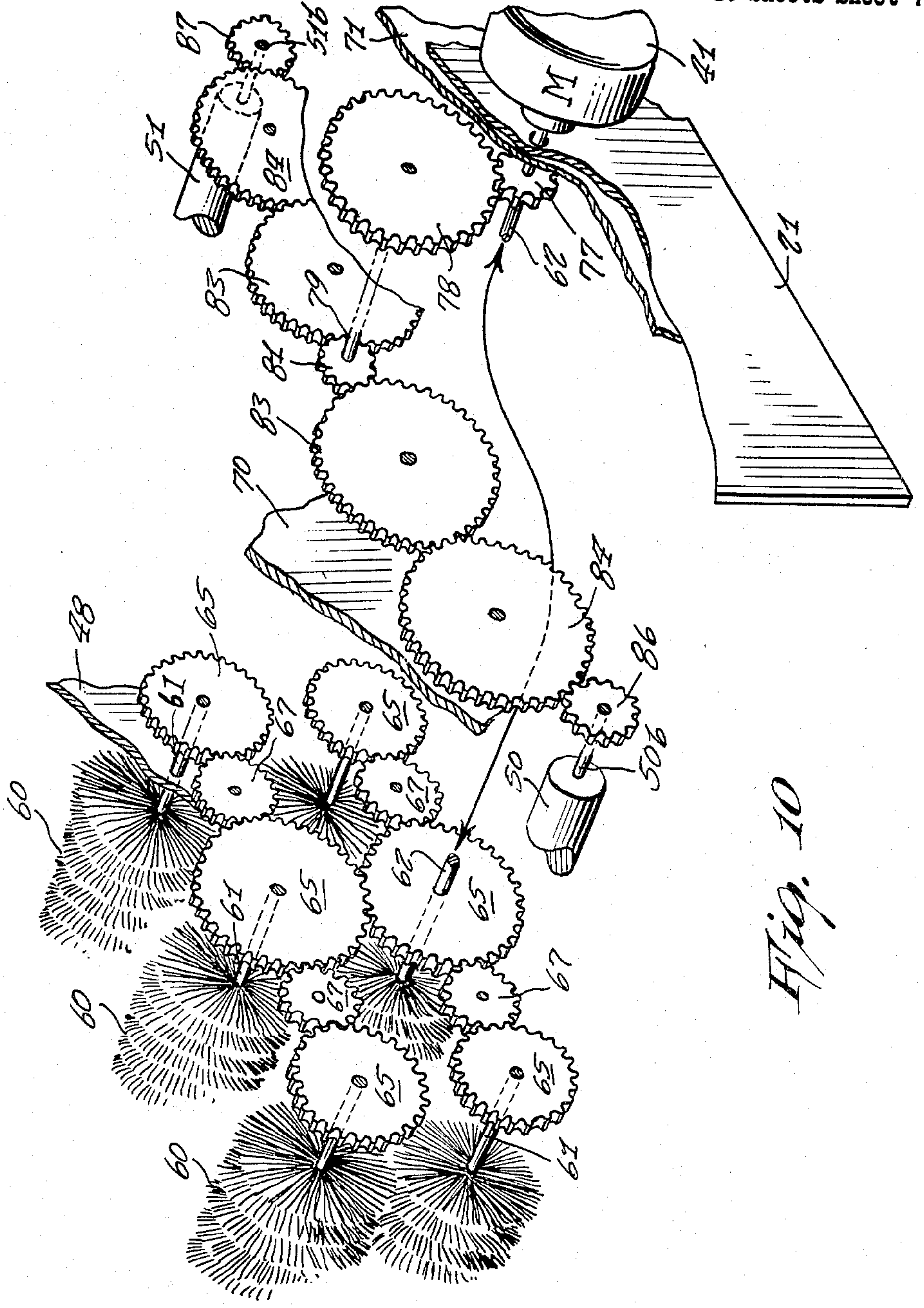
Figure 10 is an exploded fragmentary perspective view of the gear train for operating the washing and conveying apparatus of the present invention.
Figures 11, 12:
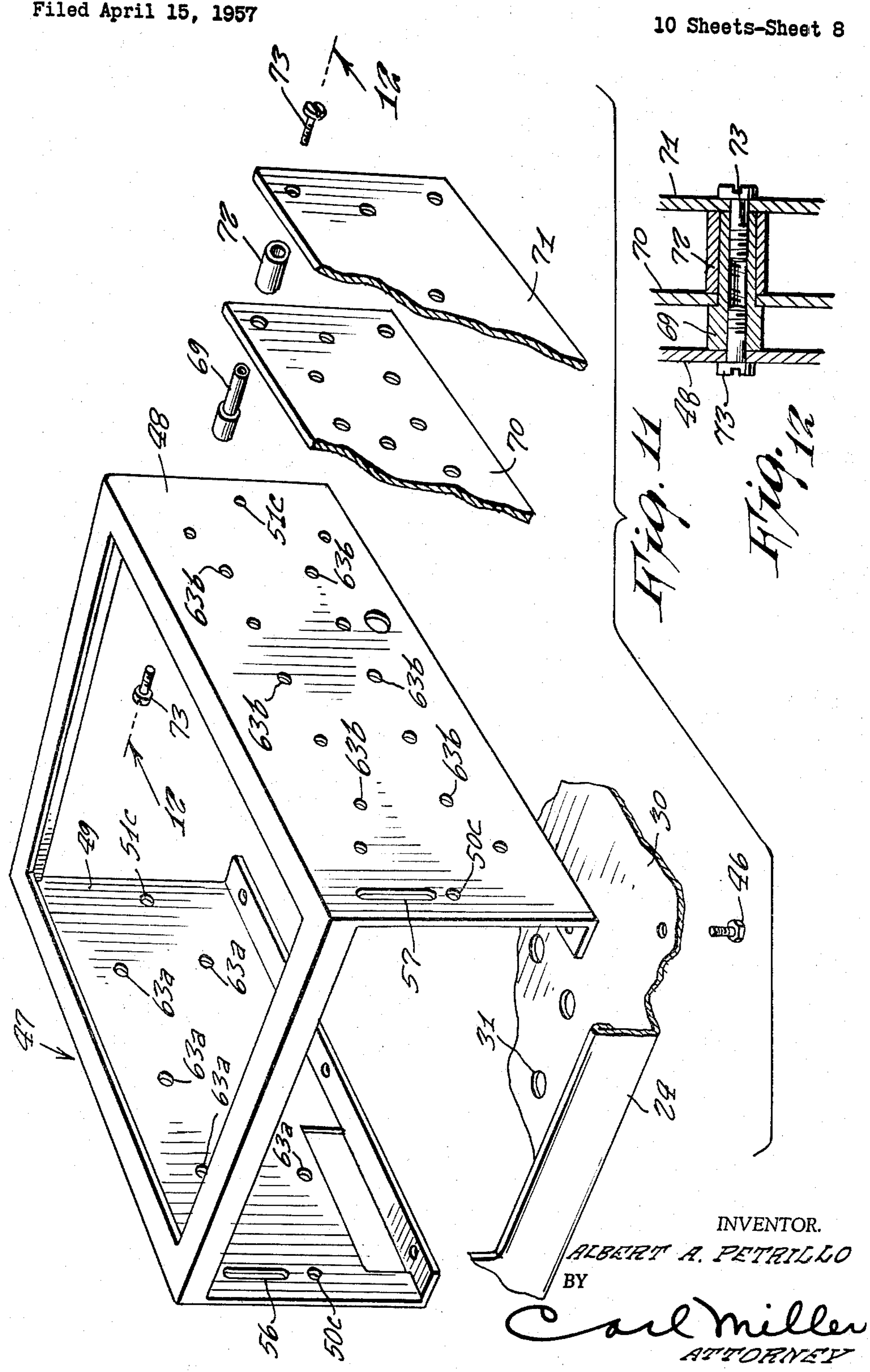
Figure 11 is a fragmentary exploded perspective view of the mounting frame forming a part of the present invention.
Figure 12 is a cross sectional view taken along line 12—12 of Figure 11, of the parts in an assembled relationship.

As is more clearly shown in Figures 11 and 12, spacer elements 69 are disposed between the one side wall 48 of the frame 47 and an auxiliary wall 70, while other spacer elements 72 are disposed between the auxiliary motor support wall 71 and the first auxiliary wall 70. The various spacer elements and walls are connected together by means of bolts 73 so as to provide several compartments and support walls for supporting the gears of the motor drive mechanism. Referring now to Figure 7 of the drawing, it will be noted that the motor 41 is supported upon the motor support wall 71 by means of mounting bolts 75. While the outer end of the motor shaft 62 is integrally connected to the central one of the brush shafts 62, the intermediate portion of the motor shaft 62 is provided with a drive pinion 77 as shown in Figure 10. This drive pinion 77 is in meshing engagement with a reduction gear 78 rotatably supported between the outer wall 21 of the housing and the motor support wall 71. This reduction gear 78 is keyed to the shaft 79 that has a drive pinion 81 at its opposite end. This drive pinion 81 is in meshing engagement with similar reduction gears 83 which act through idlers 84 to drive the pinions 86, 87, carried at the outer extremity of each of the belt drive shafts 50, 51, respectively. The operation of the device may now more readily be understood. Upon actuation of the motor 41, the drive shaft 62 is operative to effect rotation of all of the brushes 60 through the independently arranged gear train that is disposed between the side wall 48 of the frame 47 and the auxiliary wall 70. The drive pinion 77 that is also keyed to the motor shaft 62 is also operative to drive the conveyor belt system through the gear train that is disposed between the outer wall 21 of the housing and the auxiliary wall 70.

Figure 5:
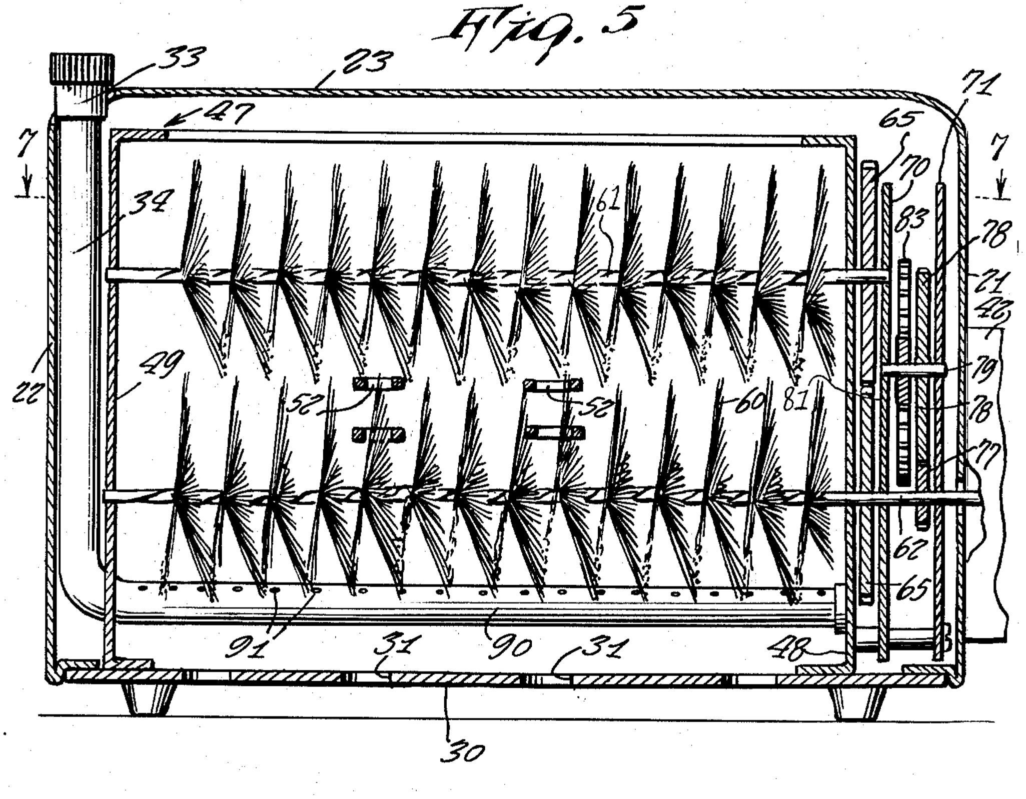
Figure 5 is a cross sectional view taken along line 5—5 of Figure 4.
Figure 6:
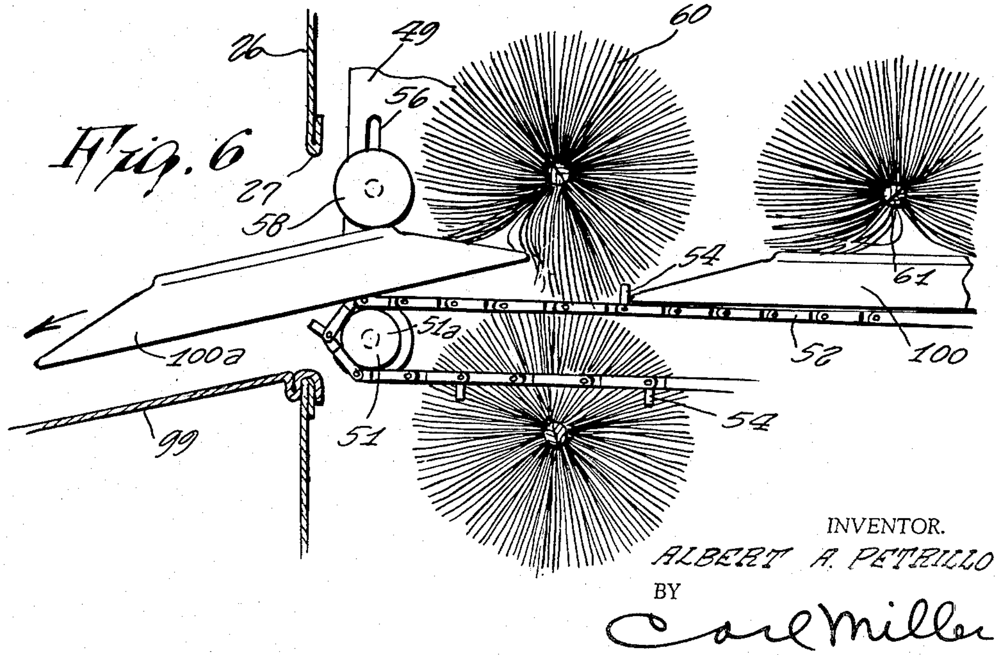
Figure 6 is an enlarged fragmentary cross sectional view showing the manner in which the dishes are washed.
Figures 15, 16, 17:
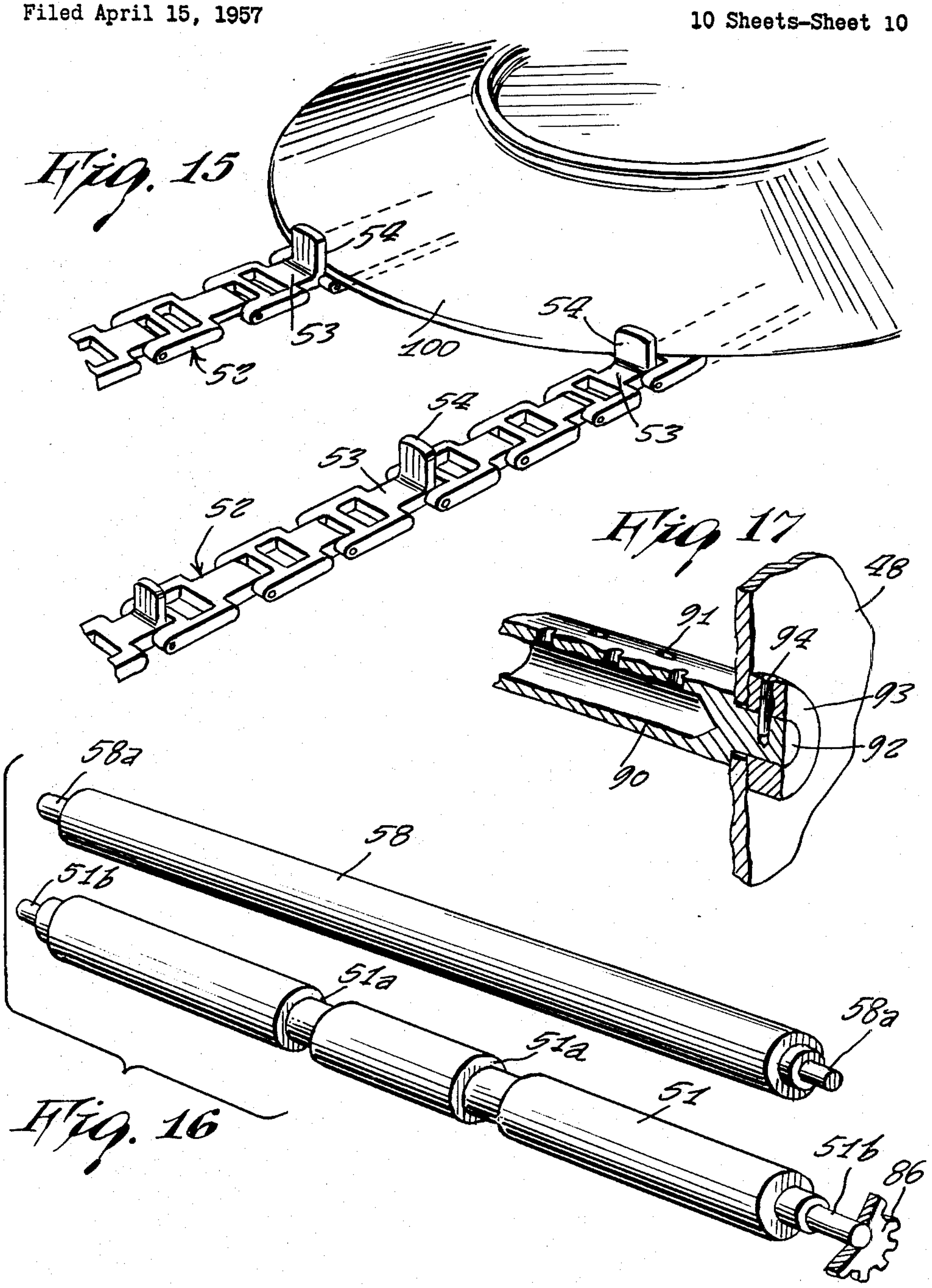
Figure 15 is a fragmentary perspective view showing the manner in which the dishes are conveyed through the machine.
Figure 16 is an exploded perspective view showing parts of the drive mechanism of the conveyer.
Figure 17 is a fragmentary perspective view showing a water supply conduit forming a part of the present invention.

Referring now to Figures 5 and 7 of the drawing, it will be noted that the water supply conduit 34 is provided with a spray pipe 90 that extends beneath the brushes 60 adjacent to the outlet end of the housing. This pipe 90 is provided with a plurality of water outlet holes 91 that spray water of any desired temperature upon the dishes as they pass between the brushes. Referring to Figure 17, it will be noted that the free end of the spray pipe 90 is closed and is provided with a stud 92 that extends through the side wall 48 of the frame 47. A washer 93 and pin 94 secure the parts together so as to increase the rigidity of the parts.

Figures 13, 14:
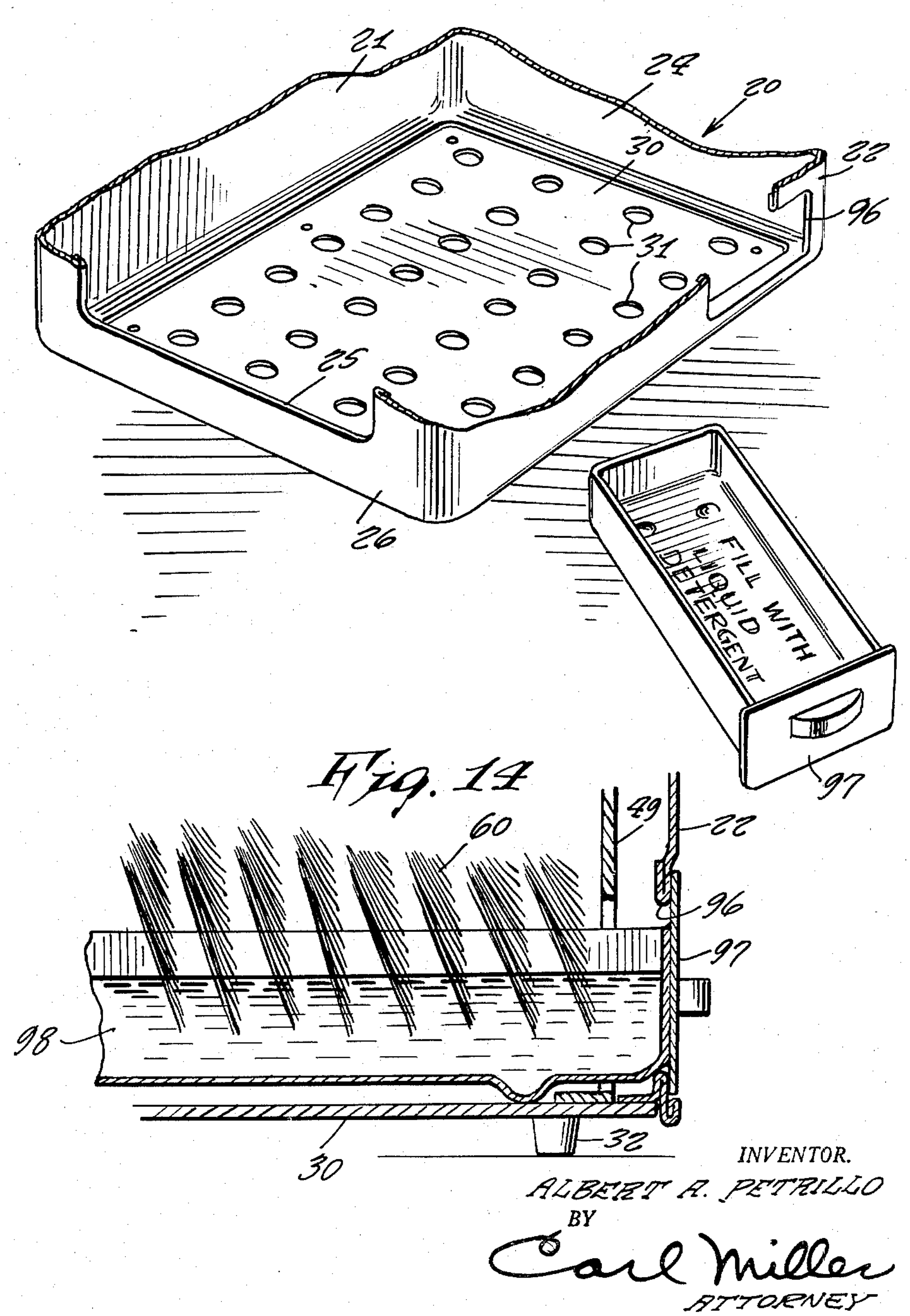
Figure 13 is a fragmentary perspective view showing the drain system and detergent tray of the present invention.
Figure 14 is a fragmentary cross sectional view taken along line 14—14 of Figure 4.

In Figure 13, it will be noted that one side 22 of the housing is provided with a cutout 96 that is adapted to slidably receive the shallow tray 97 in which a detergent 98 may be placed. Thus, as shown in Figure 14, the brushes 60 located at the inlet end of the housing are adapted to dip into the liquid detergent and apply the same to the dirty dishes as they are inserted into the machine. The outlet end of the device is provided with an inclined ramp 99 down which the clean dishes 100 may be displaced.

In operation, any type of dish 100 may be inserted into the inlet end of the housing. Immediately, the rotating brushes 60 will commence to clean the upper and lower surfaces of the dish while the first set of brushes applies a suitable detergent thereto from the tray 97. As the conveyor belts continue to move the dish past the rotating brushes, the next set of brushes which receive some of the liquid spray from the spray pipe 90 wash the surfaces of the dish so as to substantially clean them. Finally, the spray acts directly upon the dishes to remove the soap and debris from the dish as it passes between the drive shaft 51 and the pressure roller 58. Finally, as it emerges from the rollers, the clean dish **100*a* is dropped upon the ramp 99**.

It will be recognized that where great quantities of dishes are used, this machine can be modified by providing additional sets of rollers 60. Thus, instead of having a set of six rollers as shown, the number of rollers may be increased to eight, ten, twelve, etc. As a result, the dishes will have a great amount of time to dry and will be subjected to additional air currents that will further facilitate the drying operation. Of course, by using extremely hot water, and permitting sufficient air to pass into contact with the dishes, they will emerge completely dry and ready for use. All of the excess water dropping into the housing is discharged into the sink through the openings 31 in the bottom wall 30 of the housing. Thus, the machine is not only automatic insofar as the washing of the dishes is concerned, but is also self emptying and self cleaning. If desired, longer bristles may be used on each of the brushes 60, so that dishware such as cups and the like, can be washed.

While this invention has been described with particular reference to the construction shown in the drawing, it is to be understood that such is not to be construed as imparting limitations upon the invention, which is best defined by the claims appended thereto.

Having thus described my invention, I claim as new and desire to secure by Letters Patent:

1. A portable dish washing machine including the combination, with an exterior housing having a pair of end walls longitudinally spaced a distance apart, of conveyor means within the housing extending and operating substantially from one end wall to the other end wall, the one end wall having an inlet opening adjacent to one end of the conveyor means and the other end wall having a delivery opening adjacent to the other end of said conveyor means, an upper series of horizontally elongated rotary brushes mounted within said housing along the path of travel of the conveyor means with the axes thereof disposed above and transversely of said path of travel of said conveyor means, a lower series of horizontal rotary brushes individually mounted within said housing beneath the upper series of brushes in parallel therewith, the housing having a tank opening in the lower portion of one side thereof adjacent to the end wall having the inlet opening, means for rotating the upper and lower series of brushes in order to brush dishes carried past said brushes upon said conveyor means, means for simultaneously operating the latter means, and an upwardly open elongated detergent tank removably fitting in the tank opening in said side wall so as to extend substantially from the one side wall to the other side wall within said housing beneath the first rotary brush of the lower series which is adjacent to said one end wall having the inlet opening therein, the lowermost portion of said first rotary brush extending into the interior of said upwardly open detergent tank.

2. A portable dish washing machine according to claim 1, wherein the detergent tank virtually forms a horizontal drawer or tray with the outer end thereof covering the tank opening and having a handle whereby to pull out said tank from the opening at will.

3. A portable dish washing machine according to claim 2, wherein an elongated perforated spray tube is disposed between the side walls of the housing between the last two brushes of the lower series and in parallel with and below the level of the axes thereof, there being means for supplying liquid to said perforated spray tube.

References Cited in the file of this patent

UNITED STATES PATENTS

| | | |
|---|---|---|
| 976,775 | Borjeson | Nov. 22, 1910 |
| 1,421,543 | Olson | July 4, 1922 |
| 2,036,840 | Thiesen | Apr. 7, 1936 |
| 2,181,266 | Durup | Nov. 28, 1939 |
| 2,651,065 | O'Connor | Sept. 8, 1953 |
| 2,678,050 | Knapp | May 11, 1954 |

FOREIGN PATENTS

| | | |
|---|---|---|
| 64,322 | France (Addition to No. 1,057,621) | June 1, 1955 |
| 135,683 | Germany | Nov. 13, 1902 |
| 1,057,621 | France | Oct. 28, 1953 |